US007125626B2

(12) United States Patent
Kato

(10) Patent No.: US 7,125,626 B2
(45) Date of Patent: Oct. 24, 2006

(54) ION EXCHANGE ASSEMBLY FOR AN ELECTROCHEMICAL CELL

(75) Inventor: Hiroshi Kato, Okayama (JP)

(73) Assignee: Japan Gore-Tex, Inc., Tokyo (JP)

( * ) Notice: Subject to any disclaimer, the term of this patent is extended or adjusted under 35 U.S.C. 154(b) by 85 days.

(21) Appl. No.: 10/372,961

(22) Filed: Feb. 26, 2003

(65) Prior Publication Data
US 2003/0152820 A1 Aug. 14, 2003

Related U.S. Application Data

(63) Continuation of application No. 09/405,134, filed on Sep. 24, 1999, now abandoned, which is a continuation of application No. 09/200,155, filed on Nov. 25, 1998, now abandoned, which is a continuation of application No. 09/016,204, filed on Jan. 30, 1998, now abandoned, which is a continuation of application No. 08/568,100, filed on Dec. 6, 1995, now Pat. No. 6,054,230.

(30) Foreign Application Priority Data

| Dec. 7, 1994 | (JP) | .................................. 6-303672 |
| Dec. 8, 1994 | (JP) | .................................. 6-304991 |
| May 30, 1995 | (JP) | .................................. 7-131771 |

(51) Int. Cl.
*H01M 4/86* (2006.01)
*H01M 4/96* (2006.01)

(52) U.S. Cl. .............................. 429/42; 429/30; 429/44
(58) Field of Classification Search .................. 429/30, 429/31, 32, 33, 42, 44
See application file for complete search history.

(56) References Cited

U.S. PATENT DOCUMENTS

| 2,681,319 A | 6/1954 | Bodamer |
| 2,827,426 A | 3/1958 | Bodamer |
| 2,951,818 A | 9/1960 | Haagen |
| 2,965,697 A | 12/1960 | Duddy |
| 3,692,569 A | 9/1972 | Grot |
| 3,953,566 A | 4/1976 | Gore |
| 4,012,303 A | 3/1977 | D'Agostino et al. |
| 4,065,534 A | 12/1977 | Rechlicz et al. |
| 4,186,076 A | 1/1980 | de Nora et al. |
| 4,187,390 A | 2/1980 | Gore |
| 4,207,163 A | 6/1980 | Kadija |
| 4,207,164 A | 6/1980 | Kadija |
| 4,210,510 A | 7/1980 | Grimes |
| 4,218,542 A | 8/1980 | Ukihashi et al. |
| 4,224,121 A | 9/1980 | Dempsey et al. |
| 4,255,523 A | 3/1981 | Ukihashi et al. |
| 4,262,041 A | 4/1981 | Eguchi et al. |
| 4,311,567 A | 1/1982 | White |
| 4,313,832 A | 2/1982 | Shimizu et al. |
| 4,341,615 A | 7/1982 | Bachot et al. |
| 4,433,082 A | 2/1984 | Grot |
| 4,453,991 A | 6/1984 | Grot |
| 4,469,744 A | 9/1984 | Grot et al. |
| 4,518,650 A | 5/1985 | Grot et al. |
| 4,528,083 A | 7/1985 | LaConti et al. |
| 4,604,170 A | 8/1986 | Miyake et al. |
| 4,629,563 A | 12/1986 | Wrasidlo |
| 4,664,801 A | 5/1987 | Thomas |
| 4,698,243 A | 10/1987 | Carl et al. |
| 4,774,039 A | 9/1988 | Wrasidlo |
| 4,804,592 A | 2/1989 | Vanderborgh et al. |
| 4,849,311 A | 7/1989 | Itoh et al. |
| 4,863,604 A | 9/1989 | Lo et al. |
| 4,865,925 A | 9/1989 | Ludwig et al. |
| 4,865,930 A | 9/1989 | Kindler et al. |
| 4,895,775 A * | 1/1990 | Kato et al. ................. 429/42 X |
| 4,902,308 A | 2/1990 | Mallouk et al. |
| 4,931,168 A | 6/1990 | Watanabe et al. |
| 4,954,388 A | 9/1990 | Mallouk et al. |
| 4,985,296 A | 1/1991 | Mortimer, Jr. |
| 4,990,228 A | 2/1991 | Perusich et al. |
| 4,997,567 A | 3/1991 | Messalem et al. |
| 5,041,195 A | 8/1991 | Taylor et al. |
| 5,066,403 A | 11/1991 | Dutta et al. |
| 5,075,006 A | 12/1991 | Schucker |
| 5,082,472 A | 1/1992 | Mallouk et al. |
| 5,082,475 A | 1/1992 | Bentz |
| 5,094,894 A | 3/1992 | Schafferus et al. |
| 5,094,895 A | 3/1992 | Branca et al. |
| 5,124,018 A | 6/1992 | Furuya et al. |
| 5,133,842 A | 7/1992 | Taylor et al. |
| 5,154,827 A | 10/1992 | Ashelin et al. |

(Continued)

FOREIGN PATENT DOCUMENTS

EP 0326360 8/1989

(Continued)

OTHER PUBLICATIONS

Penner et al. "Ion Transporting Composite Membranes", Journal of the Electrochemical Society, vol. 132, No. 2, Feb. 1985, pp. 514-515.

(Continued)

*Primary Examiner*—Stephen J. Kalafut
(74) *Attorney, Agent, or Firm*—Morgan & Finnegan LLP

(57) ABSTRACT

This invention provides a solid polymer ion exchange membrane/electrode assembly, or an electrode/solid polymer ion exchange membrane/electrode assembly, for an electrochemical cell, which consists of planar layers of materials intimately joined together to form a unitary structure. The layers are joined together by solid polymer ion exchange resin present in at least one of each pair of adjacent layers. The unitary assembly can be used in an electrochemical cell such as a battery, electrolytic reactor, or fuel cell.

21 Claims, No Drawings

U.S. PATENT DOCUMENTS

| | | | |
|---|---|---|---|
| 5,183,545 A | 2/1993 | Branca et al. | |
| 5,183,713 A | 2/1993 | Kunz | |
| 5,186,877 A | 2/1993 | Watanabe | |
| 5,190,813 A | 3/1993 | Ohashi et al. | |
| 5,209,850 A | 5/1993 | Abayasekara et al. | |
| 5,234,777 A | 8/1993 | Wilson | |
| 5,256,503 A | 10/1993 | Cook et al. | |
| 5,275,725 A | 1/1994 | Ishii et al. | |
| 5,288,384 A | 2/1994 | Banerjee | |
| 5,336,384 A | 8/1994 | Tsou et al. | |
| 5,350,643 A | 9/1994 | Imahashi et al. | |
| 5,356,663 A | 10/1994 | Perusich et al. | |
| 5,415,888 A | 5/1995 | Banerjee et al. | |
| 5,425,865 A | 6/1995 | Singleton et al. | |
| 5,447,636 A | 9/1995 | Banerjee | |
| 5,468,574 A | 11/1995 | Ehrenberg et al. | |
| 5,472,799 A | 12/1995 | Watanabe | |
| 5,521,023 A | 5/1996 | Kejha et al. | |
| 5,523,181 A | 6/1996 | Stonehart et al. | |
| 5,545,475 A | 8/1996 | Korleski | |
| 5,547,551 A | 8/1996 | Bahar et al. | |
| 5,597,659 A | 1/1997 | Morigaki et al. | |
| 5,599,614 A | 2/1997 | Bahar et al. | |
| 5,599,638 A * | 2/1997 | Surampudi et al. | 429/33 |
| 5,635,041 A | 6/1997 | Bahar et al. | |
| 5,672,438 A | 9/1997 | Banerjee et al. | |
| 5,766,787 A | 6/1998 | Watanabe et al. | |
| 5,795,668 A | 8/1998 | Banerjee | |
| 5,874,182 A * | 2/1999 | Wilkinson et al. | 429/30 |
| 6,054,230 A | 4/2000 | Kato | |
| 6,130,175 A | 10/2000 | Rusch et al. | |
| 6,254,978 B1 | 7/2001 | Bahar et al. | |

FOREIGN PATENT DOCUMENTS

| | | |
|---|---|---|
| EP | 0574791 | 12/1993 |
| EP | 0574810 | 12/1993 |
| EP | 0579852 | 1/1994 |
| EP | 0594007 | 4/1994 |
| EP | 0661336 | 7/1995 |
| EP | 0718903 | 6/1996 |
| FR | 2295982 | 3/1977 |
| GB | 2009788 | 6/1979 |
| GB | 2052382 | 1/1981 |
| GB | 2091166 | 7/1982 |
| GB | 2097788 | 11/1982 |
| JP | 49-146570 | 12/1974 |
| JP | 51-71888 | 6/1976 |
| JP | 57-134586 | 8/1982 |
| JP | 60-84590 | 5/1985 |
| JP | 61-276987 | 12/1986 |
| JP | 62-280230 | 12/1987 |
| JP | 63-11979 | 1/1988 |
| JP | 63-99246 | 4/1988 |
| JP | WO 91/14021 | 9/1991 |
| JP | 5-75835 | 10/1993 |
| JP | 6-29032 | 2/1994 |
| WO | WO 89/06055 | 6/1989 |
| WO | WO 95/16730 | 6/1995 |
| WO | WO 96/28242 | 9/1996 |
| WO | WO 97/40924 | 11/1997 |

OTHER PUBLICATIONS

Taylor et al. "The Effect of Support Morphology on Composite Membrane Peformance", Electrochemical Society Meeting, Oct. 19-24, 1986.

Asawa "Material Porperties of Cation Exchange Membranes for Chloralkali Electrolysis, Water Electrolysis and Fuel Cells", Journal of Applied Electrochemisty, vol. 19, 1989, pp. 566-570.

Liu et al., "Ion Transporting Composite Membranes", Journal of Electrochemical Socieity, vol. 137, No. 2, Feb. 1990, pp. 510-515.

Verbrugge et al. "Composite Membranes for Fuel-Cell Applications"Aiche Journal, vol. 38, No. 1, Jan. 1992, pp. 93-100.

Kolde et al. "Advanced Composite Polymer Electrolyte Fuel Cell Membranes" Electrochemical Society Proceedings, vol. 95-23, 1995, pp. 193-201.

* cited by examiner

ION EXCHANGE ASSEMBLY FOR AN ELECTROCHEMICAL CELL

CROSS-REFERENCE TO RELATED APPLICATION

This is a continuation application under 37 C.F.R.j 1.53(b) of application Ser. No. 09/405,134, filed Sep. 24, 1999 now abandoned, which is a continuation of Ser. No. 09/200,155 filed Nov. 25, 1998 now abandoned, which is a continuation of Ser. No. 09/016,204, filed Jan. 30, 1998 now abandoned, which is a continuation of Ser. No. 08/568,100, filed on Dec. 6, 1995, now U.S. Pat. No. 6,054,230.

FIELD OF THE INVENTION

This invention relates to ion exchange membranes and electrodes for use in electrochemical devices such as batteries, fuel cells, and electrolytic reactors. More particularly, the invention relates to electrodes and solid polymer ion exchange membranes combined to form a unitary assembly.

BACKGROUND OF THE INVENTION

Electrochemical cells which employ ion exchange membranes formed of solid polymer ion exchange resins and electrodes in which catalytically-active electrically-conductive materials are included are well known in the art. Such cells can be used for the generation of electricity, for example, in fuel cells and batteries; or in electrolytic reactors, for example, for electrolysis of water, chemical synthesis, and many other uses.

Such cells are manufactured by various techniques which provide a structure of a solid polymer electrolyte (SPE) membrane, or proton exchange membrane, for ion exchange, sandwiched between electrodes for current transfer and, in the case of gaseous fuel cells, gas diffusion. Solid polymer ion exchange membranes useful in such devices can be selected from commercially available membranes, for example, perfluorinated membranes sold under the tradenames Nafion® (DuPont Co.) and Flemion® (Asahi Glass Co.); or formed as films cast from solutions containing commercially available ion exchange resins. The electrodes are often formed of electrically-conductive particulate materials (which may include catalyst materials) held together by a polymeric binder. Polytetrafluoroethylene (PTFE) resin, due to its chemical inertness and high temperature resistance, is often used as the polymeric binder. The PTFE resin is usually combined with the particulate electrode materials and molded or processed into sheet form by PTFE paste-forming processes known in the art. The cells may also include porous current collection or distribution layers, for example, platinum wire mesh or woven carbon cloth, in contact with the electrode surfaces facing away from the ion exchange membrane. Important considerations in such layered structures include uniformity in the thickness and distribution of functional materials forming, or within, the layers; and quality and durability of contact between the layers. It is also desired that the layers be as thin as possible to increase the energy efficiency and current density of the cells.

To improve the energy efficiency of the electrochemical devices, electrode structures have been modified to increase the number of reaction sites. In addition, to increase the rate of ion movement, solid polymer ion exchange resins have been included within the electrode structures. To allow the ions produced to move rapidly toward the counter electrode, it is necessary to improve the contact between the solid polymer ion exchange resin inside the electrode and the ion exchange membrane, and to lower the membrane resistance of the ion exchange membrane itself.

Conventionally, the solid polymer membranes are joined to the electrodes by hot pressing or simply held together in the cell by mechanical forces applied to them. It is difficult, however, to produce a cell with thin membranes by either method. When hot pressing is used the membrane material is softened and weakened by the heat and, if too thin, will rupture and create a gas leakage path or cause a short circuit between the electrodes. Such problems are exacerbated if the electrode surfaces have poor smoothness. When only mechanical force is used, a much greater force is required to ensure uniform contact and to obtain a low contact resistance between the membrane and electrodes, and the same problems are encountered with thin ion exchange membranes. A further disadvantage is that pressure applied to force the electrodes and membrane together, whether with or without heat, can cause compaction of the electrodes and thus reduce the gas permeability of the electrode.

Means used to address these problems include applying and drying a solution containing a solid polymer ion exchange resin to an electrode surface, and then joining the coated electrode to an ion exchange membrane by hot pressing. Another method described is to apply a solution containing a solid polymer ion exchange resin, or a solvent for the resin, to an electrode surface and then, with solvent still present on the surface, join the coated electrode to an ion exchange membrane, after which the solvent is removed. In another method a solution containing a solid polymer ion exchange resin is applied to a surface of two electrodes and, while still wet, the coated surfaces are brought together, after which the solvent is removed and an ion exchange membrane formed between the electrodes. These methods, too, suffer drawbacks in that it is very difficult to control the penetration of the applied solutions into the electrodes and excessive amounts of the solutions must be applied. This often results in impaired gas diffusitivity in the electrodes and also makes it difficult to obtain a thin ion exchange membrane with a uniform thickness.

Other methods to produce ion exchange membrane/electrode structures in which electrodes are formed on a current collector and subsequently joined to an ion exchange membrane; or in which electrodes are formed directly on an ion exchange membrane and subsequently joined to a gas diffusion material or current collector, are also known in the art. Most such methods are variants or combinations of the methods described above, except that different substrates are used, and have drawbacks similar to those described.

U.S. Pat. No. 5,234,777 (to Wilson) is for a membrane catalyst layer structure for a fuel cell which incorporates a thin catalyst layer between a solid polymer electrolyte and a porous electrode backing. Wilson discloses a catalyst film formed from an ink preparation consisting of a mixture of carbon particle-supported platinum catalyst, a solubilized ion exchange resin, and thickening agents. The electrode ink can be applied to a release surface, oven-dried to form a thin layer, and, after sufficient layers have been added to form the film, removed and hot pressed to an ion exchange membrane. An alternative method is also disclosed in which a different form of the ion exchange resin is solubilized in the ink mixture, the electrode ink is applied to the surface of an ion exchange membrane, heated and dried to form a layer, and, after sufficient layers have been added to form the film, treat the assembly to convert the ion exchange resin to its use form.

SUMMARY OF THE INVENTION

This invention provides an electrode/solid polymer ion exchange membrane assembly for an electrochemical cell comprising planar layers of materials intimately joined together to form a unitary structure. The layers are intimately joined together by a bond, formed across the layer interface, by solid polymer ion exchange resin present in at least one of each pair of adjacent layers. Each embodiment of the invention has one or more layers supported by at least one preformed support matrix formed of porous polytetrafluoroethylene. The preformed support matrix of polytetrafluoroethylene contains the electrode-forming or ion exchange membrane-forming materials of the layer, and provides strength, reinforcement, and handleability, while substantially preventing migration of the materials into adjacent layers.

A planar article or form, as used herein, is an article or form made so as to have length and width dimensions, or radial dimensions, much greater than the thickness dimension. Examples of such articles include a polymeric film or membrane, a sheet of paper, a textile fabric, a ribbon, or a disc, and the like. It is apparent that, once formed, such articles can be used as an essentially flat article, or wound, folded, or twisted into more complex configurations.

By porous as used herein is meant a structure of interconnected pores or voids such that continuous passages and pathways throughout a material are provided.

One embodiment of the invention is a unitary assembly which comprises a planar composite solid polymer ion exchange membrane comprising at least one preformed membrane-support of porous polytetrafluoroethylene which contains, and is made nonporous by, solid polymer ion exchange resin; and a planar electrode in intimate contact with and bonded to a planar surface of the solid polymer ion exchange membrane by the solid polymer ion exchange resin.

Another embodiment of the invention is a unitary assembly which comprises a planar composite solid polymer ion exchange membrane comprising at least one preformed membrane-support of porous polytetrafluoroethylene which contains, and is made nonporous by, solid polymer ion exchange resin; and two planar electrodes, each electrode in intimate contact with and bonded to a planar surface of the solid polymer ion exchange membrane by the solid polymer ion exchange resin.

Yet another embodiment of the invention is a unitary assembly which comprises a planar composite solid polymer ion exchange membrane comprising at least one preformed membrane-support of porous polytetrafluoroethylene which contains, and is made nonporous by, solid polymer ion exchange resin; and a planar electrode comprising a preformed electrode-support of porous polytetrafluoroethylene containing both a solid polymer ion exchange resin and a catalyst material, and which is in intimate contact with and bonded to a planar surface of the solid polymer ion exchange membrane by solid polymer ion exchange resin.

A further embodiment of the invention is a unitary assembly which comprises a planar composite solid polymer ion exchange membrane comprising at least one preformed membrane-support of porous polytetrafluoroethylene which contains, and is made nonporous by, solid polymer ion exchange resin; and two planar electrodes each of which comprises a preformed electrode-support of porous polytetrafluoroethylene containing both a solid polymer ion exchange resin and a catalyst material and which are in intimate contact with and bonded to a planar surface of the solid polymer ion exchange membrane by solid polymer ion exchange resin.

Other embodiments of the invention are unitary assemblies which comprise a planar solid polymer ion exchange membrane and one or two planar electrodes; each electrode comprising a preformed electrode-support of porous polytetrafluoroethylene containing both a solid polymer ion exchange resin and a catalyst material, and each electrode in intimate contact with and bonded to a planar surface of the solid polymer ion exchange membrane by solid polymer ion exchange resin.

DETAILED DESCRIPTION OF THE INVENTION

This invention provides a unitary solid polymer ion exchange membrane/electrode assembly. The solid polymer ion exchange membrane comprises at least one preformed membrane-support of porous expanded polytetrafluoroethylene which is filled and made nonporous with solid polymer ion exchange resin. The porous PTFE membrane-support is typically filled by impregnation of a liquid composition containing the ion exchange resin into the membrane-support. The electrode comprises electrode constituents, which include both a solid polymer ion exchange resin and a catalyst material, and a support matrix of polytetrafluoroethylene. The electrode is intimately joined and adhered to the solid polymer ion exchange membrane by a bond formed between the ion exchange resin present in both layers.

As noted above, in the unitary solid polymer ion exchange membrane/electrode assembly of the invention, the composite ion exchange membrane comprises at least one membrane-support consisting of a preformed porous film of polytetrafluoroethylene. Electrodes of the assembly preferably also comprise an electrode-support consisting of a preformed porous film of polytetrafluoroethylene. However, other electrode structures, also inclusive of a polytetrafluoroethylene support matrix, preferably an expanded polytetrafluoroethylene support matrix, can be obtained by mixing together electrically-conductive particulate materials and PTFE resin particles and co-forming the mixture to produce an electrode structure suitable for use in the assembly. Such methods are particularly useful for forming gas diffusion regions or gas diffusion layers of the electrodes. A process for co-forming particulate materials and polytetrafluoroethylene resin to produce a particle-filled expanded polytetrafluoroethylene film is disclosed in U.S. Pat. No. 4,985,296 (to Mortimer).

Porous polytetrafluoroethylene film suitable for use as the membrane-support or electrode-support can be made by processes known in the art, for example, by stretching or drawing processes, by papermaking processes, by processes in which filler materials are incorporated with the PTFE resin which are subsequently removed to leave a porous structure, or by powder sintering processes. Preferably the porous polytetrafluoroethylene film is porous expanded polytetrafluoroethylene film having a structure of interconnected nodes and fibrils, as described in U.S. Pat. Nos. 3,953,566 and 4,187,390 (to Gore), and European Patent Application No. 0 661 336 (to Morishita, et al.), which describe the preferred material and processes for making them.

For use as a membrane-support, the porous polytetrafluoroethylene film should have a thickness in the range 1 to 100 micrometers, preferably in the range 2 to 30 micrometers; a pore volume in the range 60 to 98 percent, preferably in the range 80 to 95 percent; and a nominal pore size in the range 0.05 to 5 micrometers, preferably in the range 0.2 to 2 micrometers. A membrane which is too thin tends to have flaws which cause short circuits or gas leaks across the membrane. If the pore size is too small, impregnation of the solid polymer ion exchange resin into the membrane-support is made difficult; and if the pore size is too large the membrane-support loses its ability to retain and prevent migration of the liquid composition containing the solid polymer ion exchange resin. Too low a pore volume increases the membrane resistance due to an insufficiency of ion exchange resin; and an excessively high pore volume results in a membrane-support film too weak for use.

For use as an electrode-support, the porous polytetrafluoroethylene film should have a thickness in the range 3 to 200 micrometers, preferably in the range 5 to 20 micrometers; a pore volume in the range 60 to 95 percent, preferably in the range 85 to 95 percent; and a maximum pore size defined by an isopropanol bubble point (IBP) in the range 0.05 to 0.5 $kg/cm^2$, preferably in the range 0.05 to 0.3 $kg/cm^2$. (A description of the Bubble Point Test is provided hereinbelow). The optimum electrode-support film thickness varies according to the amount of catalyst material needed for an application, but a thickness below about 3 micrometers makes it difficult to obtain an adequate number and proper three-dimensional distribution of catalyst sites. A thickness greater than about 200 micrometers impedes gas diffusion and ion-conduction, and the electrode cannot function properly. A pore volume less than about 60 percent increases the amount of PTFE relative to the amount of catalyst material and does not permit low resistance values to be obtained. A maximum pore size indicated by an IBP greater than 0.5 $kg/cm^2$ corresponds to a porous PTFE structure having pore sizes too small to easily introduce catalyst materials, e.g., Platinum-supporting carbon particles, into the structure. It is also preferred that the structure of the porous expanded polytetrafluoroethylene electrode-support, i.e., a structure of nodes interconnected by fibrils, be one in which the size of the nodes is as small as possible in order to increase the usable pore volume and facilitate introduction of the catalyst particles and solid polymer ion exchange resin into the structure.

It is through the use of such independently made preformed expanded polytetrafluoroethylene support membranes that the performance of the ion exchange membrane/electrode assembly can be optimized. Membrane properties such as strength, pore volume, pore size, and thickness can be tailored according to the needs of the layer of the composite assembly in which they will be used to obtain desired cell properties, such as catalyst amounts, gas diffusivity, electronic and ionic conduction. Furthermore, use of the membrane-support and electrode-support films provides much greater uniformity and reproducibility, permits a variety of manufacturing methods to be used, and thus, greater flexibility in choice of manufacturing methods, and facilitates manufacture of the assembly. Additionally, their presence during manufacture of the assembly serves to reduce problems associated with migration of solvents or other materials into adjacent layers such as are encountered in the manufacture of conventional electrochemical cell structures.

No particular limitations are placed on the ion exchange or electrolyte resins so long as they are amenable to impregnation into and retention by the membrane-support and electrode-support films. Hydrocarbon-based or fluorine-based ion exchange resins can be used as desired. Preferably, solid polymer ion exchange resins are used, in particular, solid polymer ion exchange resins which can be dissolved, or at least partially dissolved, in suitable solvents to form liquid compositions that can be impregnated into the support films. Most preferable are perfluorocarbon-based ion exchange resins, especially perfluorosulfonic acid resins, for example, such as are sold under the trademarks Nafion® (DuPont Co.) or Flemion® (Asahi Glass Co.). Suitable solvents for these ion exchange resins are well known in the art, and include various alcohols and other organic solvents, water, or mixtures of these with water. To aid in impregnation of a porous expanded polytetrafluoroethylene membrane-support film, depending on the molecular weight of the solid polymer resin or on the type of solvent used, the solvent concentration in the liquid composition can be varied, a surface treatment given to the polytetrafluoroethylene, or a surfactant used. Surfactants may also be included in the liquids to facilitate mixing and dispersion of the materials forming the liquid compositions.

As with the ion exchange resins, no particular limitations are placed on the catalyst materials so long as they are amenable to impregnation into and retention by the membrane-support and electrode-support films. Any particulate material, or powder, acting as a catalyst can be used, and will be selected according to the application intended. Examples include, but are not limited to, lead dioxide for ozone generating electrodes, platinum or platinum alloys for hydrolytic electrodes, platinum or platinum alloys supported on carbon black, and the like.

The catalyst materials and a solid polymer ion exchange resin are combined in a liquid mixture for impregnation into an electrode-support film, or for surface coating or impregnation into an electrode structure. This can be done, for example, by dispersing the catalyst powder in solvents such as those described above, and then adding ion exchange resin, or a liquid composition containing ion exchange resin, to form the liquid mixture. If desired, it is also possible to include a fluoropolymer, such as PTFE, tetrafluoroethylene/(perfluoroalkyl) vinyl ether copolymer (PFA), or tetrafluoroethylene/hexafluoropropylene copolymer (FEP), in such liquid mixtures to enhance water repellency in the electrode structure. It is also possible to include a pore-forming agent, such as ammonium bicarbonate, sodium chloride, or calcium carbonate, which is removed after formation of the membrane, for example, by heating or leaching, to create voids to improve gas diffusivity.

Catalyst materials can also be introduced into an electrode structure as a catalyst precursor. In such a case the liquid mixture to be impregnated into an electrode-support film is a mixture obtained by combining a liquid dispersion of noncatalytic electrically-conductive particles and a liquid composition containing the catalyst precursor and a solid polymer ion exchange resin. That is, it may be a liquid mixture of noncatalytic electrically-conductive particles, a solid polymer ion exchange resin, and a solid polymer ion exchange resin which has a catalyst metal precursor bonded to its exchange groups. For example, carbon black is used as the electrically-conductive particles; the carbon black is dispersed in a liquid composition containing solid polymer ion exchange resin to allow the resin to adsorb onto the carbon black. Catalyst metal anions, such as in a platinum-ammine complex solution, are then added to bring about ion exchange, after which more solid polymer ion exchange resin is added. The ingredients can be mixed simultaneously or added sequentially. When such a mixture is used, the catalyst precursor must be converted to a catalyst by some type of reducing treatment after the solid polymer ion exchange membrane/electrode has been formed. Such reducing treatments include heating and hydrogen reduction, chemical reduction using sodium borohydride, and other reducing treatments known in the art. A highly active catalyst can be obtained with the use of such methods.

In the preparation of a unitary ion exchange membrane/electrode assembly of the present invention, the pores of the porous expanded polytetrafluoroethylene membrane-support film are impregnated with a solid polymer ion exchange resin to obtain a composite membrane that is thin yet has high strength. Impregnation can be accomplished using equipment and methods known in the art, and no particular restrictions are imposed. For example, the porous expanded polytetrafluoroethylene membrane-support film can be dipped or immersed in a liquid composition containing the resin; or the liquid composition may be applied to the surface by brushing or spraying, by screen printing, by roll coating, and the like, after which the solvent is removed. Such methods may be repeated a number of times until the pores are essentially completely filled with the solid polymer ion exchange resin and a nonporous composite film is produced. The solvent can be removed by any convenient method such as air drying, heating in an oven or over heated rolls, and the like. If heating is used, temperatures which can lead to decomposition of the ion exchange resin should be avoided. Due to the strength and handleability of the porous expanded polytetrafluoroethylene film, and its ability to retain the liquid composition containing the ion exchange resin in its porous structure, the composite solid polymer ion exchange resin-filled membrane-support film can be formed separately, and subsequently intimately joined to an electrode structure; or it can also be formed in place on the surface of an electrode or other substrate, for example, by first superposing the porous expanded polytetrafluoroethylene membrane-support film on an electrode structure and then impregnating the membrane-support film, which simultaneously joins it to the electrode.

A preferred structure for the unitary solid polymer ion exchange membrane/electrode assembly of the invention comprises an electrode structure having a preformed electrode-support also consisting of a preformed porous film of polytetrafluoroethylene. The porous expanded polytetrafluoroethylene electrode-support films are impregnated with the liquid mixtures containing catalyst materials and solid polymer ion exchange resin by the same means described above. As with the ion exchange membrane-support described above, the electrode-support film can be impregnated separately; or while on a substrate providing a release surface, or on the surface of a substrate to which it is simultaneously intimately joined, such as, for example, the surface of a collector, a gas diffusion material, an ion exchange membrane, or preferably, a composite solid polymer ion exchange resin-filled membrane-support film.

In the course of impregnation and desolvation/solidification of the liquid mixtures, the solid polymer ion exchange resin causes the catalyst particles to adhere to each other and serves as a binder in fixing the catalyst particles in the internal structure of the expanded polytetrafluoroethylene matrix. The solid polymer ion exchange resin in the electrode structure thus formed also serves as a binder to intimately join the structure to a composite solid polymer ion exchange resin-filled film described above, and further serves to form routes through which the ions produced over the catalyst particles rapidly migrate to the solid polymer ion exchange membrane. The mechanical strength of the electrode structure is derived from the expanded polytetrafluoroethylene electrode-support matrix, therefore, only enough solid polymer ion exchange resin to accomplish the above purposes need be used, and results in a structure with good gas diffusibility. An excess quantity of solid polymer ion exchange resin is not needed for the development of strength properties in the polytetrafluoroethylene-supported structure and, because an excessive quantity of resin may reduce gas permeability as well as complicate manufacturing, is undesirable. Furthermore, when solvent is removed from the impregnated liquid mixture, the solid components aggregate, with an attendant decrease in volume, however, the aggregating force is accommodated and distributed by the expanded polytetrafluoroethylene matrix so that minute cracks and gaps are formed in the contracting solids, further enhancing gas diffusivity.

As noted earlier, use of preformed porous expanded polytetrafluoroethylene films makes possible a variety of manufacturing methods of the unitary solid polymer ion exchange membrane/electrode assembly of the invention. When either a supported composite ion exchange structure or composite electrode structure is made separately, it can be joined to the other by conventional methods such as by application of heat and pressure. However, a preferred method of joining the structures is by solvent-aided adhesive methods in a manner such that the influence of the solvent, or ion exchange resin and solvent used as an adhesive, is limited to the region near the junction of the layers to be joined. The retention characteristics of the expanded polytetrafluoroethylene support matrix substantially prevents migration of solid polymer ion exchange resin, even when softened by a solvent, from the supported composite ion exchange structure, and likewise, substantially prevents migration of electrode materials from a supported composite electrode structure. The solvent-aided joining of the layers can be effected, as indicated above, when one of the supported composite structures is impregnated and formed on the surface of another previously made structure. In the case where both structures to be joined have been separately made and the solvent completely removed, a light topical application of solvent, or of a liquid composition of a solvent containing solid polymer ion exchange resin, can be made to the surface to be joined of a supported composite structure, and the layers joined. An advantage of such solvent-aided adhesion is that the structure can be joined with minimal compressive force applied to them and are not deformed in the joining step. In instances where a composite structures is joined to another as it is impregnated, virtually no compressive force is applied. When a separately made and dried supported composite structure is joined to another, only a light compressive force applied in a manner to prevent formation and entrapment of air bubbles between the layers is needed.

It is apparent from the foregoing that the unitary assembly of the invention can be formed by a variety of methods and having a number of structures. For example, a unitary assembly having a composite solid polymer ion exchange resin-filled membrane-support film bonded to each side of a previously made ion exchange membrane; a unitary assembly having a composite solid polymer ion exchange resin-filled membrane-support film, on one or both sides of which is bonded an electrode structure; and, preferably, a unitary assembly having a composite solid polymer ion exchange resin-filled membrane-support film on one or both sides of which is bonded an electrode structure having a composite solid polymer ion exchange resin-filled electrode-support film.

TEST METHODS

Bubble Point Test

The Bubble Point was measured according to the procedures of ASTM F316-86. Isopropyl Alcohol was used as the wetting fluid to fill the pores of the test specimen.

The Bubble Point is the pressure of air required to displace the isopropyl alcohol from the largest pores of the test specimen and create the first continuous stream of bubbles detectable by their rise through a layer of Isopropyl Alcohol covering the porous media. This measurement provides an estimation of maximum pore size.

EXAMPLE 1

An electrode consisting of graphite particles (95 wt. %) and PTFE resin particles (5 wt. %) was prepared by conventional paste-forming methods in which the particulate materials were mixed together, lubricated, ram-extruded to form a tape, and calendered to form an electrode sheet for a lithium ion cell.

The surface of the electrode sheet was lightly coated with a solution of an alkylene oxide polymer oligomer containing 0.15 mol of lithium perchlorate per ether linkage of the oligomer and 1 wt. % (based on the total weight of oligomer and lithium perchlorate) of benzyl dimethyl ketone, an ultraviolet (UV) radiation activated crosslinking agent.

A porous expanded polytetrafluoroethylene film about 3 micrometers thick (Gore-Tex® expanded PTFE film, manufactured by Japan Gore-Tex, Inc.), and having a nominal pore size of about 1 micrometer and pore volume of 93 percent was fixed to the surface of the coated electrode sheet. The porous PTFE film was coated and impregnated with the same solution applied to the electrode sheet so as to essentially completely fill the pores of the PTFE film and contact the solution coated on the electrode sheet, after which the composite article was subjected to UV radiation to effect crosslinking, and a unitary solid polymer ion exchange membrane/electrode assembly of the invention was produced.

EXAMPLE 2

A gas diffusion electrode for a fuel cell was prepared as follows:

An aqueous dispersion of carbon black particles ("Denka Black", supplied by Denka Co.) and PTFE resin particles having a solids concentration 65 wt. % carbon black and 35 wt. % PTFE was prepared. The PTFE was coagulated, and the coagulum of mixed carbon black and PTFE dried. Naphtha was added and mixed into the dried coagulum as a lubricant. The lubricated coagulum was ram-extruded to form a tape 2.5 mm thick. The extruded tape was calendered and the thickness reduced to 250 micrometers. The calendered tape was uniaxially stretched (in the longitudinal direction) at a temperature of about 250° C. to 5 times its original length, and then again calendered to reduce its thickness by a factor of 5. The porous electrically-conductive gas permeable electrode sheet thus produced was about 50 micrometers thick, had a nominal pore size of about 1 micrometer, and a pore volume of about 78%.

A collector sheet consisting of 130 micrometer thick carbon paper, supplied from Toray Co., was impregnated with an aqueous dispersion of PTFE. The PTFE-treated collector sheet and gas diffusion electrode sheet were laminated together by application of heat (120° C.) and pressure (20 kg/cm$^2$), after which the laminated assembly was heat treated at 360° C. for 10 minutes.

A liquid mixture containing catalyst material and solid polymer ion exchange resin was prepared. The catalyst material was platinum-coated (25 wt. %) carbon black (tradename—Vulcan® XC72), and the solid polymer ion exchange resin was Nafion® perfluorosulfonic acid resin (manufactured by DuPont Co.). A dispersion of 5 grams of Pt-coated carbon black in 40 grams of 2-methyl, 1-propyl alcohol was prepared. A liquid composition of isopropyl alcohol containing 9 wt. % Nafion® perfluorosulfonic acid resin was added to the dispersion to provide a liquid mixture having a relative concentration of 30 wt. % perfluorosulfonic acid resin and 70 wt. % Pt-coated carbon. The liquid mixture was applied by brush to the surface of the gas diffusion electrode sheet, thereby forming a solid polymer ion exchange resin/catalyst containing region, and the solvent removed, thus completing the electrode structure.

A porous expanded polytetrafluoroethylene film was fixed on the solid polymer ion exchange resin/catalyst coated surface of the electrode. The PTFE film was 20 micrometers thick, had a nominal pore size of 0.2 micrometer, and a pore volume of 89%. The porous PTFE film was coated with a liquid composition of isopropyl alcohol containing 5 wt. % Nafion® perfluorosulfonic acid resin (manufactured by DuPont Co.), and air dried. The coating and air drying steps were repeated 5 times until the pores of the PTFE film were essentially completely filled, the layers joined by the solid polymer ion exchange resin present in each layer, the composite membrane-support film became semitransparent, and the surface of the film coated with the solid polymer ion exchange resin. The composite assembly was heat treated at 130° C. for 24 hours, and a unitary solid polymer ion exchange resin/electrode assembly was obtained.

A second unitary solid polymer ion exchange resin/electrode assembly was obtained exactly as described above. The membrane-supported ion exchange resin surface of one of the assemblies was coated with a liquid composition of isopropyl alcohol containing 2 wt. % Nafion® perfluorosulfonic acid resin, placed on the membrane-supported ion exchange resin surface of the second assembly and lightly pressed to remove entrapped air, after which the solvent was removed by air drying and the joined assemblies heat treated at 130° C. for 24 hours.

The unitary assemblies thus joined formed a larger unitary embodiment of the invention to which further components were joined. The complete assembly described above was mounted and operated as a gaseous fuel cell Humidified hydrogen was fed on one side of the mounted assembly, and oxygen was fed on the other side at an operating temperature of 80° C. The cell developed a voltage of 0.78 volts at a current level of 1 A/cm$^2$.

Comparative Example 1

An electrochemical cell assembly was prepared as described in Example 2, except that no membrane-support films were used and the liquid composition of isopropyl alcohol containing Nafion® perfluorosulfonic acid resin was applied directly to the gas permeable electrode sheet. Numerous cracks formed, and partial separation from the substrate occurred.

The electrochemical cell assembly was tested in a fuel cell as described in Example 2, and developed a voltage of 0.67 volts at a current level of 1 A/cm$^2$.

EXAMPLE 3

A composite membrane-supported solid polymer ion exchange resin-filled film was prepared separately. The PTFE film was 15 micrometers thick, had a nominal pore size of 0.2 micrometer, and a pore volume of 89%.

The porous expanded polytetrafluoroethylene membrane-support film was mounted in an open frame which gripped the film at the edges to restrain It from shrinking during impregnation of a liquid composition of isopropyl alcohol containing 5 wt. % solid polymer ion exchange resin (Nafion® perfluorosulfonic acid resin). The restrained film was coated with the liquid composition which was absorbed by the porous membrane-support film, and air dried. The coating and drying steps were repeated three times, the pores of the PTFE film were essentially completely filled, and a semitransparent film was produced A small amount of the same liquid composition was then applied by brush to the surface of the Nafion® resin-filled membrane-support film thus produced and the wetted surface placed on the solid polymer ion exchange resin/catalyst coated surface of an electrode structure, made as described in Example 2, and lightly pressed to remove entrapped air and intimately join the film to the electrode structure. The solvent was removed by air drying, thus completing a unitary assembly of the invention.

EXAMPLE 4

A composite membrane-supported solid polymer ion exchange resin-filled film was prepared separately, as described in Example 3.

A small amount of solvent, isopropyl alcohol, was applied by brush to the solid polymer ion exchange resin/catalyst coated surface of an electrode structure (made as described in Example 2). the Nafion® resin-filled membrane-support film was immediately placed on the wetted surface of the electrode structure and lightly pressed to remove entrapped air and intimately join the film to the electrode structure. The solvent was removed by air drying, thus completing a unitary assembly of the invention.

EXAMPLE 5

A composite membrane-supported solid polymer ion exchange resin-filled film was prepared as described in Example 3, except that the porous expanded polytetrafluoroethylene membrane-support film was 30 micrometers thick.

A small amount of a liquid composition of isopropyl alcohol containing 5 wt. % solid polymer ion exchange resin (Nafion® perfluorosulfonic acid resin)solvent, isopropyl alcohol, was applied by brush to both surfaces of the resin-filled film and the film was sandwiched between the solid polymer ion exchange resin/catalyst coated surfaces of two electrode structures (made as described in Example 2). The assembly was lightly pressed together to remove entrapped air and intimately join the film to the electrode structures. The solvent was removed by air drying, thus completing a unitary assembly of the invention.

EXAMPLE 6

A porous expanded polytetrafluoroethylene film was fixed on the solid polymer ion exchange resin/catalyst coated surface of an electrode structure (made as described in Example 2). The PTFE film was 40 micrometers thick, had a nominal pore size of 0.7 micrometer, and a pore volume of 92%. The porous PTFE film was coated with a liquid composition of isopropyl alcohol containing 5 wt. % Nafion® perfluorosulfonic acid resin (manufactured by DuPont Co.), and air dried. The coating and air drying steps were repeated 3 times until the pores of the PTFE film were substantially filled. A fourth coating step was conducted, the solid polymer ion exchange resin/catalyst coated surface of a second electrode structure was lightly pressed against the wetted surface and joined by the solid polymer ion exchange resin present in each layer. The solvent was removed by air drying, thus completing a unitary assembly of the invention.

EXAMPLE 7

A liquid dispersion of fine lead dioxide particles (0.2 micrometer particle size) in isopropyl alcohol was prepared. To the dispersion was added a liquid composition of isopropyl alcohol containing 5 wt. % Nafion® perfluorosulfonic acid resin (manufactured by DuPont Co.) and thoroughly mixed to form a first liquid mixture, having a relative concentration of 15 wt. % ion exchange resin and 85 wt. % lead dioxide.

A porous expanded polytetrafluoroethylene electrode-support film (thickness—12 micrometers; pore volume—93%; IBP-0.08 kg/cm$^2$) was superposed on a polypropylene release sheet and passed through the nip of a roll coater. The first liquid mixture described above was roll-coated on the surface of the electrode-support film and forced into the pores of the electrode-support film, after which the solvent was removed by air drying, the impregnated electrode-support film removed from the release sheet, and a first electrode thus completed.

A dispersion of carbon black/platinum (20 wt. %) particles (from NE Chemcat Co.) in isopropyl alcohol was prepared. To the dispersion was added a liquid composition of isopropyl alcohol containing 5 wt. % Nafion® perfluorosulfonic acid resin (manufactured by DuPont Co.) and thoroughly mixed, with the aid of ultrasonic agitation, to form a second liquid mixture, having a relative concentration of 40 wt. % ion exchange resin and 60 wt. % carbon black supported platinum.

A second porous expanded polytetrafluoroethylene electrode-support film, identical to the first electrode-support, was fixed to the surface of 200 micrometers thick carbon paper (manufactured by Toray Co.). The second liquid mixture was coated on the surface of the electrode-support film and impregnated into the pores of the film, after which the solvent was removed by air drying, and a second electrode thus completed.

A solid polymer ion exchange membrane (Nafion® 117 perfluorosulfonic acid membrane, manufactured by DuPont. Co.) was sandwiched between the first electrode structure and the second electrode structure, and laminated by application of heat (140° C.) and pressure (25 kg/cm$^2$) to form a unitary assembly of the invention.

A platinum-plated titanium mesh was applied to the surface of the first electrode as a collector, and the unitary assembly and collector sandwiched between ribbed, platinum-plated, stainless steel plates to form an electrochemical cell. Purified water was fed to the ribbed portions, and the cell was operated as an ozone generator by water electrolysis using a solid polymer electrolyte.

EXAMPLE 8

A dispersion of 5 grams of carbon black/platinum (25 wt. %) particles (from NE Chemcat Co.) in 40 grams of 2-methyl, 1-propyl alcohol was prepared. To the dispersion was added a liquid composition of isopropyl alcohol containing 9 wt. % Nafion® perfluorosulfonic acid resin (manufactured by DuPont Co.) and thoroughly mixed, with the aid of ultrasonic agitation, to form a liquid mixture, having a relative concentration of 25 wt. % ion exchange resin and 75 wt. % carbon black supported platinum.

A collector sheet consisting of 230 micrometer thick carbon paper, manufactured by Toray Co., was impregnated with an aqueous dispersion of PTFE to develop water repellency, and then heat treated at 360° C. for 10 minutes. A porous expanded polytetrafluoroethylene electrode-support film (thickness—16 micrometers; pore volume—94%; IBP-0.12 kg/cm$^2$) was fixed to the surface of the carbon paper. The liquid mixture was applied by brush to impregnate the pores of the electrode-support film, after which the solvent was removed by air drying. The composite structure was heat treated at 120° C. for 24 hours, thus completing a first electrode.

A porous expanded polytetrafluoroethylene membrane-support film (thickness—20 micrometers; pore volume—93%; IBP—0.15 kg/cm$^2$) was fixed to the ion exchange resin/catalyst impregnated surface of the first electrode. The porous PTFE film was coated by brush with a liquid composition of isopropyl alcohol containing 5 wt. % Nafion® perfluorosulfonic acid resin (manufactured by DuPont Co.), and air dried. The coating and air drying steps were repeated 3 times until the pores of the PTFE film were essentially completely filled and the layers joined by the solid polymer ion exchange resin present in each layer, thus forming a first unitary assembly of the invention.

An aqueous dispersion of carbon black particles ("Denka Black", supplied by Denka Co.) and PTFE resin particles having a solids concentration 60 wt. % carbon black and 40 wt. % PTFE was prepared. The PTFE was coagulated, and the coagulum of mixed carbon black and PTFE dried. Naphtha was added and mixed into the dried coagulum as a lubricant. The lubricated coagulum was ram-extruded to form a tape 2.5 mm thick. The extruded tape was calendered and the thickness reduced to about 300 micrometers. The calendered tape was uniaxially stretched (in the longitudinal direction) at a temperature of about 250° C. to 5 times its original length, and then again calendered to reduce its thickness by a factor of 5. The electrically-conductive gas permeable electrode sheet thus produced was about 60 micrometers thick, had a nominal pore size of about 1 micrometer, and a bulk density of 0.51 g/cc. A collector sheet, identical to the collector sheet bonded to the first electrode, was fixed to one surface of the gas permeable electrode sheet.

A porous expanded polytetrafluoroethylene electrode-support film, identical to the electrode-support film of the first electrode, was fixed to the other surface of the gas permeable electrode sheet, and impregnated with the liquid mixture of ion exchange resin/catalyst particles, and heat treated as described above, thus forming a second electrode.

A porous expanded polytetrafluoroethylene membrane-support film, identical to the membrane-support joined to the first electrode, was fixed to the ion exchange resin/catalyst impregnated surface of the second electrode, and was impregnated with the same materials and in the same manner, thus forming a second unitary assembly of the invention.

A small amount of the same liquid composition of isopropyl alcohol containing 5 wt. % Nafion® perfluorosulfonic acid resin described above was then applied by brush to the surface of the Nafion® resin-filled membrane-support film of the second assembly and the ion exchange resin-containing surfaces of the first and second assemblies were brought together and lightly pressed to remove entrapped air and intimately join the assemblies, after which the solvent was removed by air drying and another embodiment of the unitary assembly of the invention completed.

This embodiment of the invention was mounted and operated as a gaseous fuel cell. Humidified hydrogen was fed on one side of the mounted assembly, and oxygen was fed on the other side at an operating temperature of 80° C. The cell developed a voltage of 0.71 volts at a current level of 1 A/cm$^2$.

EXAMPLE 9

A porous expanded polytetrafluoroethylene membrane-support film (thickness—10 micrometers; pore volume—83%; IBP—1.75 kg/cm$^2$) was superposed on a polypropylene release sheet. The membrane-support film was coated by brush with a liquid composition of isopropyl alcohol containing 5 wt. % Nafion® perfluorosulfonic acid resin (manufactured by DuPont Co.), and air dried at 70° C. The coating and air drying steps were repeated 4 times until the pores of the PTFE film were essentially completely filled, resulting in a virtually transparent composite solid polymer ion exchange membrane.

A liquid mixture containing 25 wt. % Nafion® perfluorosulfonic acid resin (manufactured by DuPont Co.) and 75 wt. % carbon black/platinum (30 wt. %) particles (from NE Chemcat Co.) was prepared as described in Example 8.

A porous expanded polytetrafluoroethylene electrode-support film (thickness—10 micrometers; pore volume—91%; IBP—0.13 kg/cm$^2$) was fixed to the surface of the composite solid polymer ion exchange membrane on the polypropylene release sheet. The liquid mixture was applied by brush to the surface of the electrode-support film, impregnated into the pores of the film, and joined to the PTFE membrane-supported solid polymer ion exchange membrane. The solvent was removed by air drying at 70° C., and a unitary assembly of the invention was produced.

A second assembly was formed in like manner. The two assemblies were brought together with the ion exchange membrane surfaces in contact, thermally fused together by passage through the nip of a pair of rolls heated to 150° C., and removed from the polypropylene release sheet, thus forming another embodiment of the invention having a unitary assembly in an electrode/solid polymer ion exchange membrane/electrode arrangement.

A porous gas permeable electrode sheet and a PTFE-treated carbon paper collector, of the materials and arranged as described in Example 2, were disposed against each electrode surface of the electrode/solid polymer ion exchange membrane/electrode embodiment and held in place in a fuel cell by mechanical force exerted against them by ribbed gas supply separators. In the fuel cell, one electrode served as the air electrode, while the other served as the hydrogen electrode. When the fuel cell was supplied with air and hydrogen, an output of 0.64 volts at a current density of 0.5 A/cm$^2$ was obtained. The alternating current resistance was about 0.07 ohm-cm$^2$, and there was virtually no change in the resistance after 800 hours of operation.

EXAMPLE 10

Two unitary solid polymer ion exchange membrane/electrode assemblies were made as described in Example 9, except that the porous expanded polytetrafluoroethylene membrane-support film fixed on the polypropylene release sheet was 6 micrometers thick and only two impregnation/drying steps used to impregnate and fill the film with the liquid composition of isopropyl alcohol containing 5 wt. % Nafion® perfluorosulfonic acid resin.

A separately prepared Nafion® 112 perfluorosulfonic acid ion exchange membrane (manufactured by DuPont Co.) was interposed between the ion exchange membrane surfaces of the unitary assemblies and bonded by hot pressing at a temperature of 140° C. and pressure of 30 kg/cm² to form a unitary electrode/solid polymer ion exchange membrane/electrode assembly of the invention.

This embodiment of the invention was placed in a fuel cell having the arrangement described in Example 9 and, when supplied with oxygen and hydrogen, the fuel cell had an output of 0.6 volts at a current density of 1 A/cm².

EXAMPLE 11

A liquid mixture containing 25 wt. % Nafion® perfluorosulfonic acid resin (manufactured by DuPont Co.) and 75 wt. % carbon black/platinum (30 wt. %) particles (from NE Chemcat Co.) was prepared as described in Example 8.

A porous expanded polytetrafluoroethylene electrode-support film (thickness—10 micrometers; pore volume—91%; IBP—0.13 kg/cm²) was placed on the surface of a polypropylene release sheet. The liquid mixture was applied by brush to the surface of the electrode-support film and impregnated into the pores of the film. The solvent was removed by air drying at 70° C., and a first electrode was completed.

A porous expanded polytetrafluoroethylene membrane-support film (thickness—18 micrometers; pore volume—85%; IBP—1.75 kg/cm²) was superposed on the electrode. The membrane-support film was coated by brush with a liquid composition of isopropyl alcohol containing 9 wt. % Nafion® perfluorosulfonic acid resin (manufactured by DuPont Co.), and air dried at 70° C. The coating and air drying steps were repeated 5 times until the pores of the membrane-support film were essentially completely filled, and the ion exchange membrane thus formed was joined to the electrode.

A porous expanded polytetrafluoroethylene electrode-support film as used in the first electrode was placed on the ion exchange membrane of the assembly described above. A second electrode was formed and joined to the ion exchange membrane in the same manner and with the same materials as the first electrode. After the final drying step, the unitary electrode/solid polymer ion exchange membrane/electrode assembly of the invention was removed from the polypropylene release sheet.

This embodiment of the invention was used to construct a fuel cell having the arrangement described in Example 9 and, when supplied with air and hydrogen, the fuel cell had an output of 0.62 volts at a current density of 0.5 A/cm². The alternating current resistance of the fuel cell was 0.065 ohm-cm².

I claim:

1. A unitary assembly for an electrochemical cell comprising:
   an electrode having at least one electrically conductive material and a membrane support comprising polytetrafluoroethylene, said support being impregnated with a polymer ion exchange resin and having a surface, and
   a layer of ionomer joined to the electrode at said surface having a polymer ion exchange resin.

2. A unitary assembly according to claim 1, in which the polytetrafluoroethylene of the electrode is expanded polytetrafluoroethylene.

3. A unitary assembly according to claim 1, in which said layer of ionomer comprises a polytetrafluoroethylene support.

4. A unitary assembly according to claim 3, in which said polytetrafluoroethylene support comprises:
   a composite nonporous solid polymer ion exchange membrane having first and second planar surfaces, said ion exchange membrane comprising at least one preformed membrane-support film of porous expanded polytetrafluoroethylene having a plurality of micropores, and
   a solid polymer ion exchange resin essentially completely filling the micropores of the membrane support film.

5. A unitary assembly according to claim 3 in which said polytetrafluoroethylene support of said layer of ionomer is preformed.

6. A unitary assembly according to claim 3, in which said polytetrafluoroethylene support of said layer of ionomer has a thickness of 1 to 100 micrometers.

7. A unitary assembly according to claim 3, in which said polytetrafluoroethylene support of said layer of ionomer has a pore volume of 60 to 98 percent.

8. A unitary assembly according to claim 3, in which said polytetrafluoroethylene support of said layer of ionomer has a thickness of 1 to 100 micrometers and a pore volume of 60 to 98 percent.

9. A unitary assembly according to claim 3, in which said porous polytetrafluoroethylene support of said layer of ionomer is made nonporous by said solid polymer ion exchange resin.

10. A unitary assembly according to claim 1, in which said layer of ionomer comprises a porous expanded polytetrafluoroethylene support.

11. A unitary assembly according to claim 1 in which the polytetrafluoroethylene of the electrode is preformed.

12. A unitary assembly according to claim 1, in which the polytetrafluoroethylene of the electrode is a particle-filled expanded polytetrafluoroethylene film.

13. A unitary assembly according to claim 1, in which said electrically conductive material comprises a catalyst.

14. A unitary assembly according to claim 13, wherein said catalyst is selected from the group consisting of lead dioxide, platinum and platinum alloys, and mixtures thereof.

15. A unitary assembly according to claim 14 in which said platinum and platinum alloys catalysts are supported on carbon black.

16. A unitary assembly according to claim 13, in which said membrane support comprises a polytetrafluoroethylene membrane impregnated with a liquid dispersion of noncatalytic electrically-conductive particles and a liquid composition containing a precursor of said catalyst and said polymer ion exchange resin.

17. A unitary assembly according to claim 13, in which said catalyst precursor is bonded to exchange groups of said polymer ion exchange resin.

18. A unitary assembly according to claim 13, in which said noncatalytic electrically-conductive particles comprise carbon black.

19. A unitary assembly according to claim 13, in which said catalyst precursor comprises a platinum-ammine complex solution.

20. A unitary assembly according to claim 13, in which said catalyst is contained in the polytetrafluoroethylene of the electrode.

21. A unitary assembly according to claim 1, in which the electrode and said layer of ionomer are adhesively joined by said polymer ion exchange resin.

* * * * *

UNITED STATES PATENT AND TRADEMARK OFFICE
CERTIFICATE OF CORRECTION

PATENT NO. : 7,125,626 B2 Page 1 of 1
APPLICATION NO. : 10/372961
DATED : October 24, 2006
INVENTOR(S) : Hiroshi Kato It is certified that error appears in the above-identified patent and that said Letters Patent is hereby corrected as shown below:

At Column 1:
Line 7, please delete "37 C.F.R. j 1.53(b)" and insert -- 37 C.F.R. § 1.53(b) --;

At Column 16:
Line 62, delete "13" and insert -- 16 --;

Line 65, delete "13" and insert -- 16 --;

At Column 17:
Line 1, delete "13" and insert -- 16 --;

Signed and Sealed this

Nineteenth Day of December, 2006

JON W. DUDAS
*Director of the United States Patent and Trademark Office*